(12) United States Patent
Hollander et al.

(10) Patent No.: US 8,085,143 B2
(45) Date of Patent: Dec. 27, 2011

(54) UNIVERSAL WIRELESS TRANSCEIVER

(75) Inventors: Milton B. Hollander, Stamford, CT (US); Michael A. Macchiarelli, Shelton, CT (US)

(73) Assignee: OMEGA Engineering, Inc., Stamford, CT (US)

( * ) Notice: Subject to any disclaimer, the term of this patent is extended or adjusted under 35 U.S.C. 154(b) by 403 days.

(21) Appl. No.: 12/470,969

(22) Filed: May 22, 2009

(65) Prior Publication Data

US 2009/0315725 A1  Dec. 24, 2009

Related U.S. Application Data

(63) Continuation-in-part of application No. 11/877,285, filed on Oct. 23, 2007.

(60) Provisional application No. 60/862,697, filed on Oct. 24, 2006.

(51) Int. Cl.
*G08B 29/00* (2006.01)
*G08B 1/08* (2006.01)
*H04W 24/00* (2009.01)

(52) U.S. Cl. .................. 340/514; 340/531; 340/538.15; 340/538.17; 340/539.19; 340/539.24; 455/423; 455/73

(58) Field of Classification Search .................. 340/514
See application file for complete search history.

(56) References Cited

U.S. PATENT DOCUMENTS

| | | | |
|---|---|---|---|
| 5,907,491 A | 5/1999 | Canada et al. | |
| 6,056,595 A | 5/2000 | Passwater et al. | |
| 6,208,247 B1 * | 3/2001 | Agre et al. | 340/539.19 |
| 6,720,887 B1 | 4/2004 | Zunti | |
| 7,327,228 B2 * | 2/2008 | Min et al. | 340/426.1 |
| 7,463,140 B2 * | 12/2008 | Schmidt | 340/514 |
| 2002/0091501 A1 | 7/2002 | Durbin et al. | |

* cited by examiner

*Primary Examiner* — Donnie Crosland
(74) *Attorney, Agent, or Firm* — Michaud-Kinney Group LLP

(57) ABSTRACT

A wireless transceiver includes a microprocessor for processing signals and communication circuitry coupled to the microprocessor. The communication circuitry includes input/output circuitry for receiving signals from a plurality of wireless devices over a wireless communication path, for providing the signals to the microprocessor, and for transmitting processed signals from the microprocessor to the plurality of wireless devices. The input/output circuitry of the transceiver includes a non-wireless connection coupling the wireless transceiver to a test and measurement device. The test and measurement device receives the processed signals from the microprocessor, processes the received signal and data and/or information encoded therein, and performs a predetermined response thereto.

18 Claims, 7 Drawing Sheets

UNIVERSAL WIRELESS TRANSCEIVER

CROSS-REFERENCE TO RELATED APPLICATIONS

This application is a continuation-in-part of and claims priority to U.S. patent application, Ser. No. 11/877,285, filed Oct. 23, 2007 which claims the benefit of U.S. Provisional Application No. 60/862,697, filed Oct. 24, 2006. The disclosures of these U.S. patent documents are incorporated by reference herein in their entireties.

BACKGROUND OF THE INVENTION

1. Field of the Invention

The present invention relates generally to an apparatus for sensing or measuring a parameter of a process and, more particularly, to a self contained module for enhancing data communication from a sensing and measuring device to a process display, control and/or recording device.

2. Description of Related Art

Generally speaking, it is desirable to sense and measure a plurality of characteristics of commercial or industrial processes. For example, process variable such as, for example, temperature, pressure, strain, resistance, voltage, velocity, and the like, can positively and negatively influence process control and optimization. In view thereof, industry invests substantial resources to accurately sense and measure processes. Typically, a system of process controls employs sensors at various points in a process. The sensors are coupled to test and measurement instruments that receive data and/or information via signals from the sensors and determine one or more process variables. The test and measurement instruments may include displays and control devices for exhibiting the received signals and/or determined process variables, and for controlling a predetermined response thereto. Typically, data, signals and/or commands are communicated between sensors and the test and measurement instruments over communication paths by means of point-to-point hard wired connections such as, for example, electrical wires, fiber optic or like connections. As can be appreciated, establishing and maintaining such wired communication paths may be time consuming, costly and error prone.

In the aforementioned commonly owned, U.S. patent application Ser. No. 11/877,285, from which this application claims priority, a wireless connector is taught. As disclosed in a Background Section of this commonly owned U.S. patent document, the test and measurement devices generally include a sensor terminated with a connector. The connector is in turn coupled to another connector or to a test and measurement instrument by wire, fiber optic, or other hardwired connection. In a measurement or control application of, for example, commercial and/or industrial processes multiple sensors are typically attached by hardwired connections. Moreover, the extent and/or accuracy that a particular characteristic may be measured or controlled may be limited by a length or number of required connections in the communication path. As described in the application, it is advantageous to utilize multiple sensors without the drawbacks of multiple hardwired connections. Accordingly, the commonly owned application discloses communication paths employing wireless connectors between sensors and test and measurement instruments. The wireless connector includes a first connector of a sensor such as, for example, a thermocouple, that senses a process characteristic and converts the sensed characteristic into data communicated via a signal. The first connector then wirelessly transmits the signal to a second connector coupled to instrument, meter or like process control device that processes the signal and the data and/or information encoded therein.

Accordingly, it would be advantageous to be able to utilize multiple sensors without the drawbacks of multiple hardwired connections.

SUMMARY OF THE INVENTION

A wireless transceiver is presented. The wireless transceiver includes a microprocessor for processing signals and communication circuitry coupled to the microprocessor. The communication circuitry includes input/output circuitry for receiving signals from a plurality of wireless devices over a wireless communication path, for providing the signals to the microprocessor, and for transmitting processed signals from the microprocessor to the plurality of wireless devices. The input/output circuitry of the transceiver includes a non-wireless connection coupling the wireless transceiver to a test and measurement device. The test and measurement device receives the processed signals from the microprocessor, processes the received signal and data and/or information encoded therein, and performs a predetermined response.

In one embodiment, the plurality of wireless devices includes a wireless connector. The wireless connector includes a sensor for sensing a process variable and a transmitter for transmitting the process variable as data and/or information within signals to the wireless transceiver over the wireless communication path. In one embodiment, the process variable includes at least one of temperature, voltage, humidity, pressure, strain, resistance, motion, light, current, velocity and flow.

In another embodiment, a system for controlling a process is provided. The system includes a plurality of sensors for sensing at least one process variable at predetermined points of the process and a plurality of wireless transmitters coupled to corresponding ones of the plurality of sensors. Each of the plurality of wireless transmitters receives signals including the sensed process variable from the corresponding one of the sensors, and transmits the signals over a wireless communication path. The system also includes a wireless communication transceiver. The wireless transceiver receives the transmitted signals from the wireless transmitters. In one embodiment, the wireless communication transceiver includes a microprocessor for processing the received signals and communication circuitry coupled to the microprocessor. The communication circuitry has input/output circuitry for receiving the signals, providing the signals to the microprocessor and for transmitting processed signals from the microprocessor to the plurality of wireless devices. The system further includes at least one test and measurement device coupled to the wireless communication transceiver by a non-wireless connection. The test and measurement device receives the processed signals from the microprocessor over the non-wireless connection, evaluates the process variable and controls a predetermined response thereto.

BRIEF DESCRIPTION OF THE DRAWINGS

The foregoing aspects and other features of the presently disclosed embodiments are explained in the following description, taken in connection with the accompanying drawings, wherein.

In these figures like structures are assigned like reference numerals, but may not be referenced in the description of all figures.

DETAILED DESCRIPTION OF PREFERRED EMBODIMENTS

Figure 1:
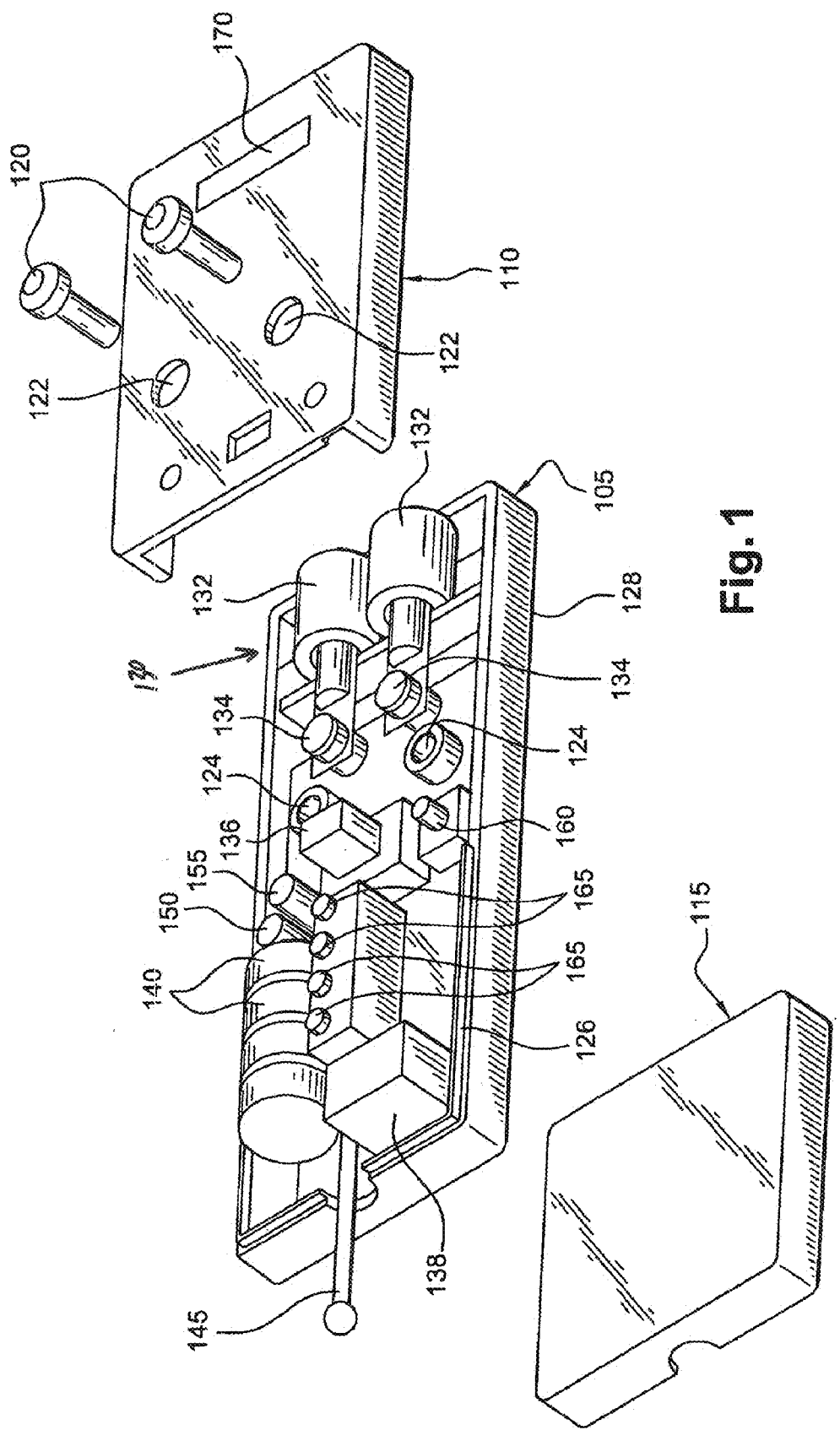
FIG. 1 is a schematic diagram of a wireless connector in accordance with one embodiment of the present invention.

FIG. 1 is a schematic diagram of a wireless connector 100 for receiving, processing and transmitting data, information and/or control signals over a wireless communication path, in accordance with one embodiment of the present invention. Although the presently disclosed embodiments will be described with reference to the drawings, it should be understood that they may be embodied in many alternate forms. It should also be understood that in addition, any suitable size, shape or type of elements or materials could be used.

The wireless connector 100 includes circuitry for processing a signal received from a sensor and a transmitter for transmitting the processed signal. As shown in FIG. 1, in one embodiment the wireless connector 100 includes a base 105, a first cover portion 110, and a second cover portion 115. The first cover portion 110 may be secured in position on the base 105 by fasteners 120 such as, for example, two screws 120, which pass through holes 122 in the first cover portion 110 and engage threaded bosses 124 of the base 105. The second cover portion 115 is secured on the base 105 by any conventional means such as, for example, by making a sliding fit on side wall ribbing 126 which may be appropriately undercut. In one embodiment, the base 105 includes an encircling wall 128 which may be cut away (not shown) at a first end, shown generally at 130, to permit connection of input/output lines a sensor to appropriate contacts 132 mounted on respective terminal posts 134 secured on the base 105.

Processing circuitry 136 may also be optionally provided within the wireless connector 100. The processing circuitry 136 may be implemented using hardware components, one or more processors running one or more programs, or a combination of both and may be re-programmable to perform any suitable processing operations.

Communication circuitry 138 is included within the wireless connector 100 for transmitting signals provided by the sensor or signals output by the processing circuitry 136. In one embodiment, the communication circuitry 138 is only capable of transmitting signals. In another embodiment, the communication circuitry 138 includes transceiver circuitry for two-way wireless communication, e.g., both for transmitting data and information signals and for receiving data, information and command and control signals over the wireless communication path. For example, the communication circuitry 138 is capable of receiving command/control signals from a remote device and, optionally, in combination with the processing circuitry 136, performing received command/control actions or operations based on the received command/control signals. The communication circuitry 138 may also alter processing or communication operations based on the received command/control signals. In addition, the communication circuitry 138 may, optionally, in combination with the processing circuitry 136, be capable of transmitting command/control signals for controlling another device communicating with the wireless connector 100.

As described herein, the communication circuitry 138 provides wireless communication over the wireless communication path using any of a variety of different physical and protocol layer communication methods. For example, the communication technology may include optical, infrared, radio transmission, RFID, or any other suitable communication technology, and may incorporate IRDA, IEEE 802.11, 802.15, Bluetooth, PCS or any other suitable communication method or standard. For example, the ZigBee™ standard, based on IEEE 802.15, may also be utilized for its low power requirements, built in recognition capabilities, high reliability and relatively small packaging size (ZIGBEE is a registered trademark of ZigBee Alliance Corporation, San Ramon, Calif.). In an exemplary embodiment, the communication circuitry 138 is a ZigBee end device. In other exemplary embodiments, the communication circuitry 138 is a ZigBee coordinator or a ZigBee router.

In one embodiment, the processing circuitry 136 and the communication circuitry 138 are combined together as a single module. In one embodiment, the wireless connector 100 includes a power supply 140 that includes one or more batteries for providing power to the processing circuitry 136, the communication circuitry 138, the sensor, or any other function requiring power. In one embodiment, an optional emitting device 145 is connected to the communication circuitry 138 to extend the range of communication, for example, to extend the wireless communication path. The emitting device 145 is included within and extends from the wireless connector 100 as shown or may be enclosed by the wireless connector 100. In exemplary embodiments, the emitting device 145 may be, for example, an antenna, an optical emitter, or any other suitable emitting device. The wireless connector 100 may optionally have various indicators and controls such as a battery status indicator 150, a transmit/receive indicator 155, an on/off switch 160, adjustable components and additional switches 165 for calibration and for controlling the processing circuitry 136, the communication circuitry 138, and a display 170.

In exemplary embodiments, when assembled, the wireless connector 100 may have a form factor similar to a ceramic, or miniature ceramic thermocouple connector body such as sold by the assignee of the present application, Omega Engineering, Inc. (Stamford, Conn.), under a UWTC series of product models. While the processing circuitry 136, the communication circuitry 138, the emitting device 145, the various indicators and controls, and the power supply 140 are shown as having a particular size and shape, it should be understood that they may have any suitable size and shape, may be miniaturized, may be arranged together in various combinations, and may be combined in a single package or device.

Figure 2:
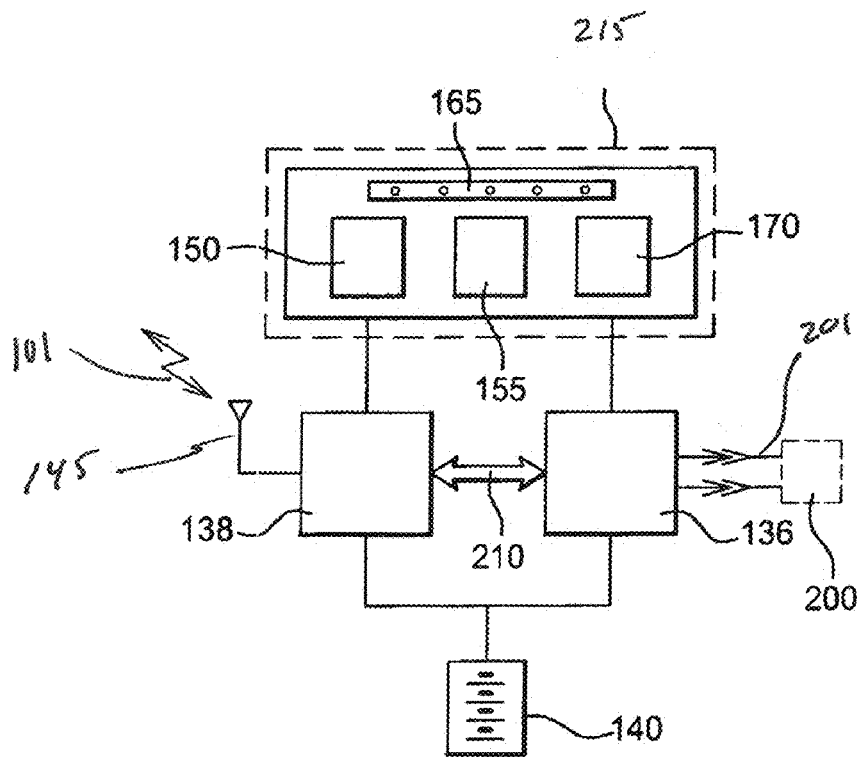
FIG. 2 is a simplified block diagram of circuitry of the wireless connector of FIG. 1.

FIG. 2 is a simplified block diagram of the circuitry of the wireless connector 100, according to one embodiment of the invention. The circuitry includes the processing circuitry 136, the communication circuitry 138, optional indicators and controls 215, the optional emitting device 145, and a power supply 140. The circuitry of the wireless connector 100 cooperates to measure, collect, process, store and transmit over a communication path 101 data and information associated with the wireless connector 100 and with signals 201 received from a sensor 200.

Figure 3:
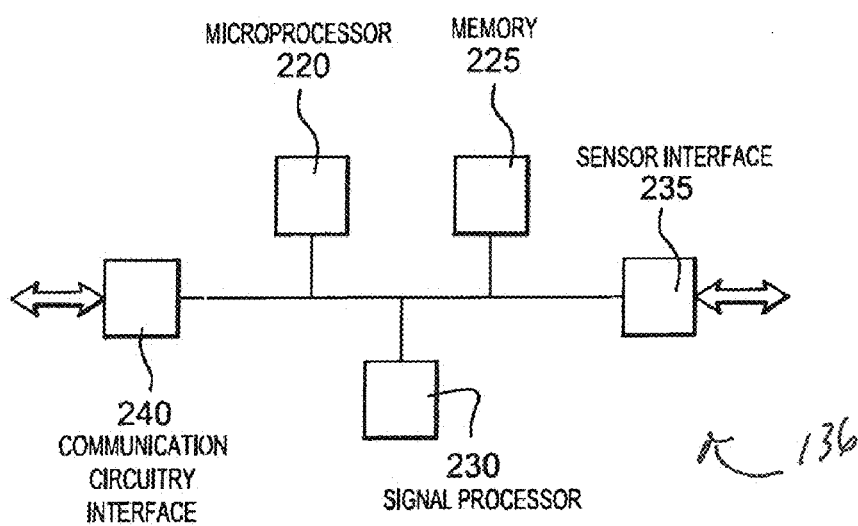
FIG. 3 is a simplified block diagram of processing circuitry of the wireless connector of FIG. 1 according to disclosed embodiments.

FIG. 3 is a simplified block diagram of the processing circuitry 136, according to one embodiment of the invention. The processing circuitry 136 includes a microprocessor 220, a memory device 225, a signal processor 230, a sensor interface 235, and an interface 240 to the communication circuitry 138. The microprocessor 220 performs control functions, time keeping and recording functions, connector diagnostic functions, signal processing functions and data storage functions by executing programs stored in the memory device 225. The memory device 225 is a computer readable medium including magnetic, optical, semiconductor, or other storage technology. The memory device 225 stores programs which cause the microprocessor 220 to operate according to the disclosed embodiments. The signal processor 230 processes the signals 201 received from the sensor 200 (FIG. 2) either independently or under control of the microprocessor 220.

The microprocessor 220 monitors and controls the communication circuitry 138 through the interface 240. For example, the microprocessor 220 instructs the communication circuitry 138 to establish communication over the communication path 101 with another device. The microprocessor 220 provides the communication circuitry 138 with data and/or information, e.g., signals 201 from the sensor 200 or processed signals from the signal processor 230, and instructs the communication circuitry 138 to transmit the data and/or information over the wireless communication path 101, for example, on a periodic basis. In the event that communication with the other device is lost, the microprocessor 220 may instruct the communication circuitry 138 to monitor the connection and to re-establish communication when the other device becomes available and to resume transmission of the data and/or information.

The microprocessor 220 may also operate to store data and/or information related to the signals 201 received from the sensor 200 or processed signals from the signal processor 230. For example, signals 201 including data and/or information from the sensor 200 and/or from the signal processor 230 may be accumulated and stored in the memory 225 for transmission at a later time period. In one embodiment, the signals 201 including data and/or information may be accumulated, stored in the memory 225, and then transmitted when instructed by the microprocessor 220, for example, in response to an event, on a particular date/time, or in response to a switch closure or a command received through the communication circuitry 138. Using the example above, the signals 201 from the sensor 200 may be accumulated and stored in the memory 225 during periods of lost communication and then sent when communication is re-established.

In exemplary embodiments, the microprocessor 220 or the signal processor 230, alone or in combination, process, modify or condition the signals 201 from the sensor 200. For example, microprocessor 220 or signal processor 230 may filter, amplify, compress, apply various algorithms or functions, or otherwise manipulate or clarify the signals 201 from the sensor 200. As another example microprocessor 220 or signal processor 230, alone or in combination may process, modify or condition the signals 201 from the sensor 200 to accommodate characteristics of a device receiving the transmitted data. The processed, modified or conditioned signals may be transmitted or stored and transmitted as described above, e.g., over the wireless communication path 101. The microprocessor 220 and the signal processor 230 may also provide other types of data and/or information for transmission or storage and transmission. For example, test or measurement time stamps may be included in the signals 201 from the sensor 200, a connector serial number, a functional state or status of the connector 100 derived from running diagnostic functions, power supply information, location in real time, and the like. Moreover, the data and/or information transmitted may include parity bits or like measures for ensuring complete point-to-point transmission. The data and/or information transmitted may also employ security protocols including encryption and the like to provide secure transmission.

In one embodiment, the sensor 200 is a transducer capable of converting a measurable process characteristic to a signal for use by the wireless connector 100. For example, the sensor 200 may include a measurement device for sensing pressure, temperature, humidity, gas, pH, infrared, ultraviolet, visible light, voltage, current, power, conductivity, strain, load or acceleration. In an example where the sensor 200 is a thermocouple, such as a type-K thermocouple, the microprocessor 220 or the signal processor 230, alone or in combination, process, modify or condition the signals 201 from sensor 200 to appear as another type of thermocouple such as, for example, a type-J thermocouple while maintaining temperature accuracy. As a result, a J-type receiving device, such as a panel meter may display the proper temperature regardless of the type of thermocouple used to collect the temperature data. Thus, different types of sensors may be used as measuring devices for different types of receiving devices and instruments.

Returning to FIG. 2, the processing circuitry 136 is connected to the communication circuitry 138 through a signal path 210. Both the processing circuitry 136 and the communication circuitry 138 may be connected to the optional indicators and controls 215, including the indicators 150 and 155, the display 170, and the adjustable components 165. The emitting device 145 is connected to the communication circuitry 138 for transmitting data and/or information over the wireless communication path 101. The power supply 140 supplies power to all components requiring power.

Figure 4:
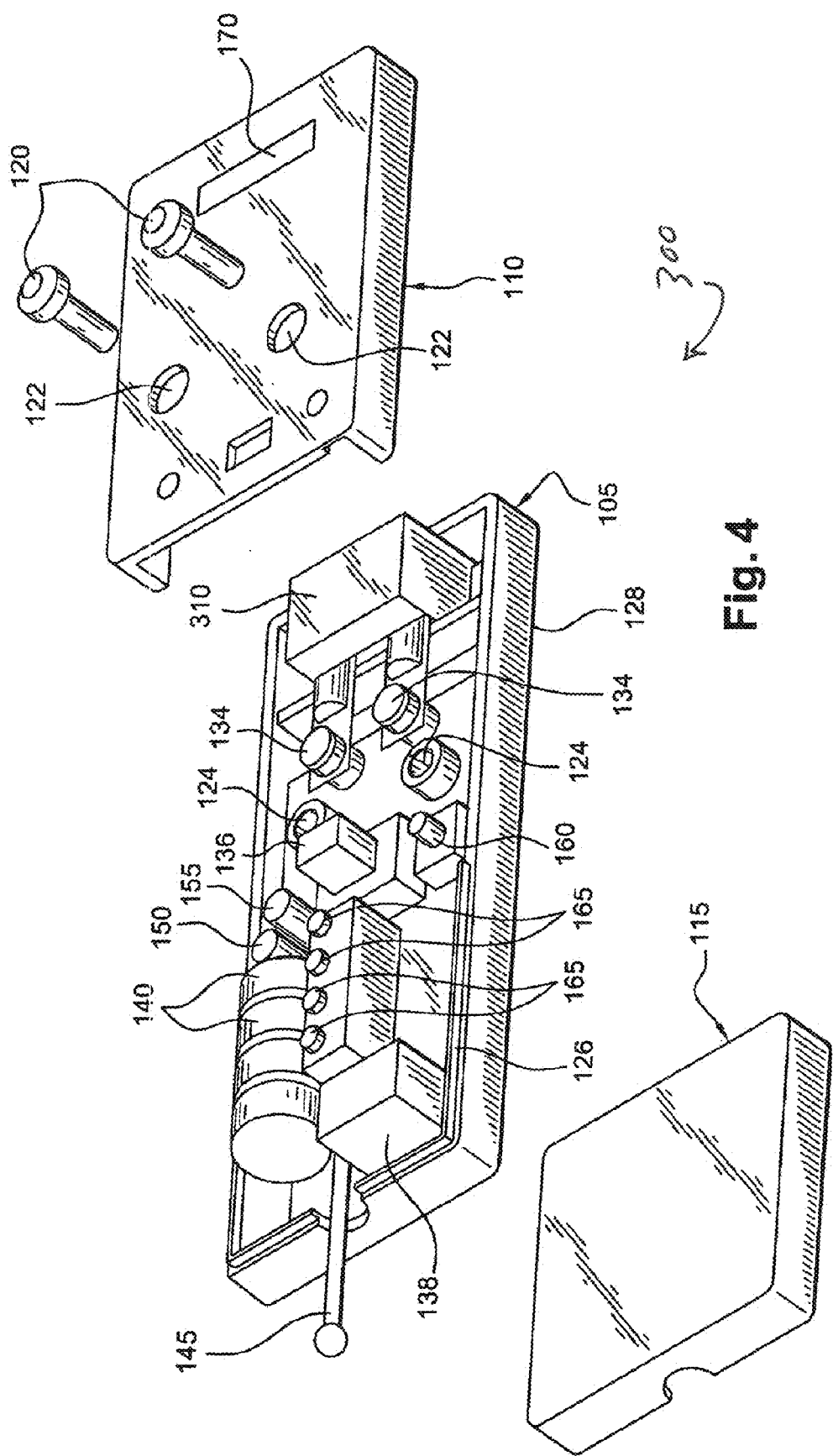
FIG. 4 is a schematic diagram of a wireless connector having a built in or self contained sensor.

FIG. 4 shows an embodiment of a wireless connector 300 with a built in or self contained sensor 310. The sensor 310 may be enclosed by the wireless connector 300 or may extend beyond the boundaries of the connector's body (e.g., the base 105). The wireless connector 300 includes the processing circuitry 136 and the communication circuitry 138 and may optionally include the indicators and controls 215, including the indicators 150 and 155, the display 170, the adjustable components 165, and the emitting device 145.

Figure 5:
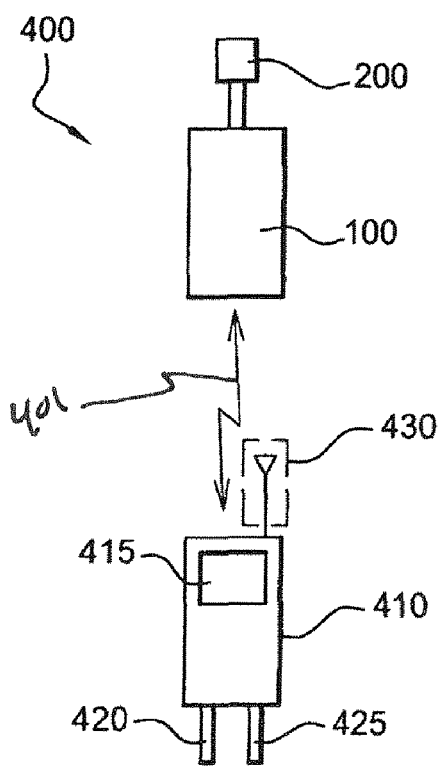
FIG. 5 is a schematic diagram of a wireless connector system for test and measurement data communication, in accordance with one embodiment.

FIG. 5 illustrates one embodiment of a wireless connector system 400 for test and measurement data communication along a wireless communication path 401 between a plurality of devices. In FIG. 5, the sensor 200 is connected to and provides test and measurement signals (e.g., the signals 201) to the wireless connector 100. The wireless connector 100 processes the test and measurement signals and transmits the signals over a wireless communication path 401 using any of the protocols mentioned above, or any other suitable wireless communication protocol. A second connector 410 includes data communication circuitry 415 for receiving the signals 201 transmitted by the wireless connector 100. The data communication circuitry 415 may include two way communication capabilities to receive signals from the wireless connector 100 and to exchange data, information such as status information, command and control information, and the like. In one embodiment, the data communication circuitry 415 controls the communication circuitry 138 and the processing circuitry 136 of the wireless connector 410 by issuing commands and instructions. For example, the data communication circuitry 415 instructs the communication circuitry 138 and the processing circuitry 136 of the connector 100 to process test and measurement signals 201 from the sensor 200, and to transmit the data and/or information at a predetermined rate or during a particular date/time slot to the connector 410. As a further example, the data communication circuitry 415 may also instruct the processing circuitry 136 to process the received signals 201 using particular techniques or algorithms. For example, the data communication circuitry 415 instructs the communication circuitry 138 and the processing circuitry 136 to start up, shut down, or to activate another device such as a relay or display.

The data communication circuitry 415 may also manage communication among a plurality of wireless connectors (e.g., the wireless connectors 100 and 300 as described below) by independently recognizing each of the plurality of connectors as they communicate, and assigning each of the plurality of connectors different communication channels, for example, different frequencies, time slots, chipping codes, or other differentiating communication characteristics. The second connector 410 may optionally include an external emitting device 430. The second connector 410 may also communicate with the connector 300 or multiple connectors 100 and 300. In an exemplary embodiment data communication circuitry 415 may be a ZigBee coordinator or a ZigBee router.

In one embodiment, the second connector 400 includes a power supply, for example, a battery for supplying power to data communication circuitry 415. Similar to disclosed embodiments of the connectors 100 and 300, in one embodiment the second connector 410 may have a form factor similar to a ceramic or miniature thermocouple connector body. The second connector 410 may also have male connector pins 420, 425 with cylindrical or blade shaped extending contacts.

The second connector 410 may plug into an instrument, meter, or other suitable equipment (described below) and provide signals from the sensor 200 to the equipment. Thus, the signals 201 from the sensor 200 may be provided without a hardwired connection between the sensor 200, the connectors 100 and 410, and the test and measurement equipment.

Figure 6:
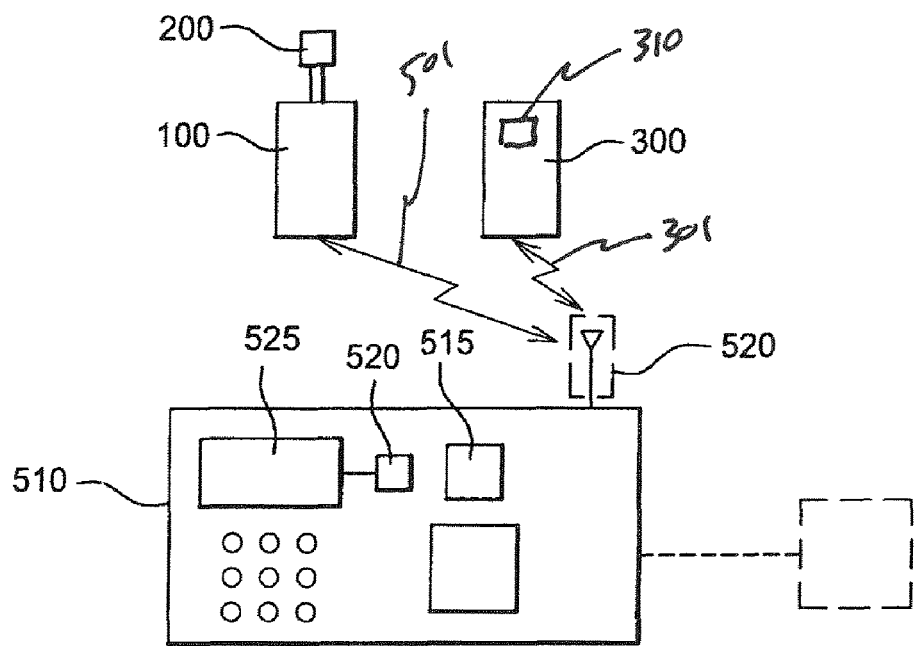
FIG. 6 is a schematic diagram of a wireless connector system where a connector communicates directly with an instrument, meter, or other suitable equipment, in accordance with one embodiment.

FIG. 6 shows yet another aspect of the invention, where the connector 100 communicates directly with an instrument, meter, or other suitable equipment 510. The equipment 510 may include data communication circuitry 515 for receiving the signals (e.g., the signals 201) transmitted by the connector 100 over a wireless communication path 501. The equipment 510 may optionally include an external emitting device 520. The data communication circuitry 515 may include two way communication capabilities to receive the signals from the connector 100 and to exchange data, information such as status information, and command/control information. The data communication circuitry 515 may have all the capabilities of the data communication circuitry 415 described above. Similar to the data communication circuitry 415 described above, the data communication circuitry 515 may also manage communication among multiple connectors (e.g., the connectors 100 and 300) by recognizing additional connectors as they communicate and assigning them different communication channels, for example, different frequencies, time slots, chipping codes, or other differentiating communication characteristics. In an exemplary embodiment, the data communication circuitry 515 may be a ZigBee coordinator or a ZigBee router.

In one embodiment, the equipment 510 includes test and measurement capabilities. For example, the equipment 510 may be any one or any combination of a meter, test equipment or a control device for processing pressure, temperature, humidity, gas, pH, infrared, ultraviolet, visible light, voltage, current, power, conductivity, strain, or acceleration. Similar to other embodiments, the signals 201 from the sensor 200 may be provided without a hardwired connection between the sensor 200 and the equipment 510 such as by being transmitted over the wireless communication path 501. The equipment 510 may also communicate over a second wireless communication path 301 with the connector 300 having a built in sensor (e.g., the sensor 310) as described above. The equipment 510 may include circuitry 520 for driving a display to present data related to the received signal in human readable form. The equipment 510 may also include processing circuitry 515 for further conditioning the received signal and process control circuitry 525 for controlling an external process 530 using the received signal or an output of processing circuitry 515.

Other embodiments of the wireless connector 100 may be included as part of a thermocouple assembly, imbedded into a thermocouple head and well assembly, or into a thermocouple package or housing. The wireless connector 100 may be connected to thermocouple assemblies, pressure transducers, load cells, anemometers, and other sensors, as well as RTDs and thermistors. Alternately, the components of the wireless connector 100 may be incorporated into these and other types of assemblies.

Figure 7:
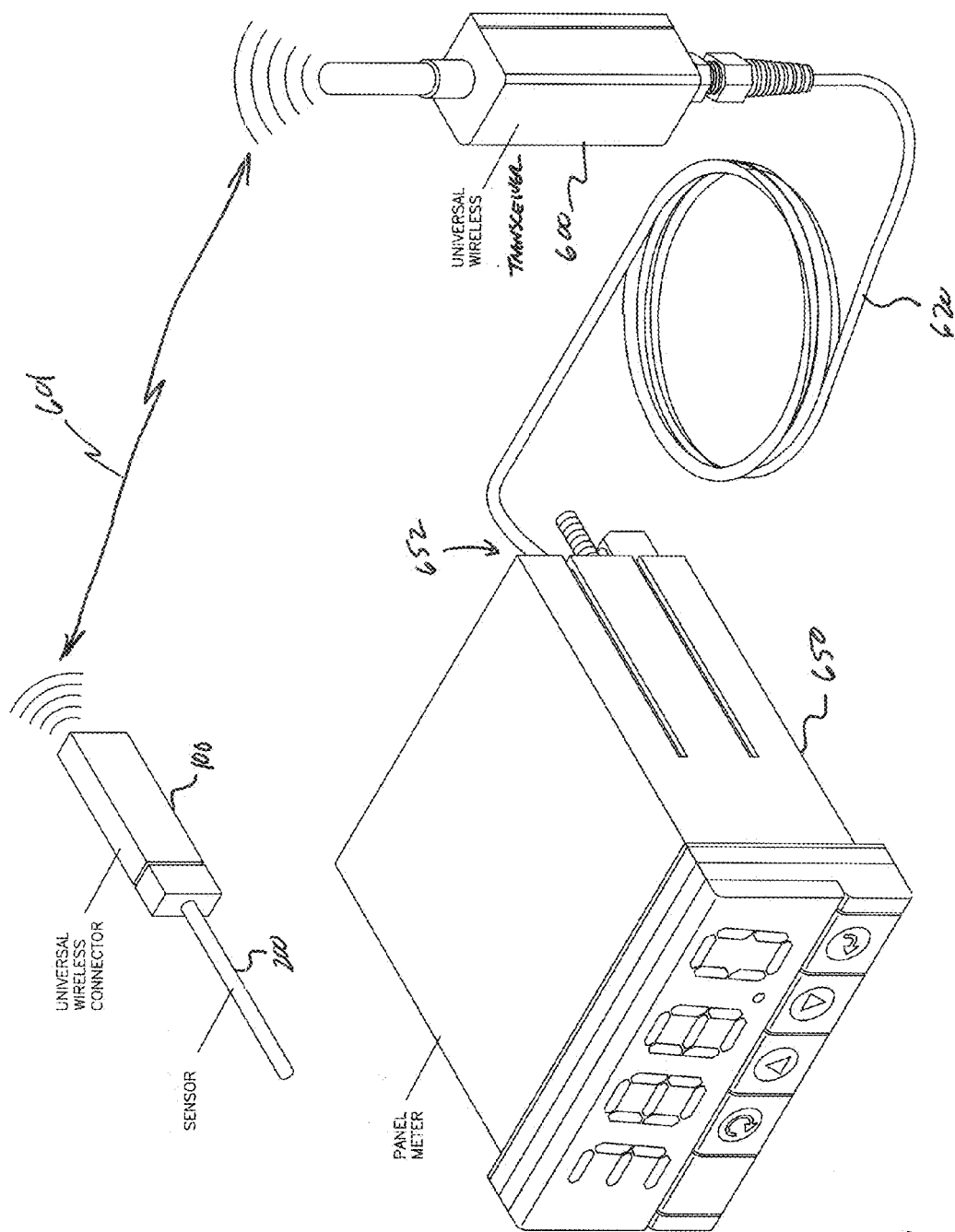
FIG. 7 is a schematic diagram of a wireless transceiver system where a wireless connector communicates sensor signals to an instrument, meter, or other suitable equipment by means of the transceiver, in accordance with one embodiment.

In one aspect of the invention, illustrated in FIG. 7, the wireless connector 100 transmits the signals 201 received from the sensor 200 over a wireless communication path 601 to a universal wireless transceiver 600. The universal wireless transceiver 600 is coupled via a non-wireless connection 620 to a test and measurement device 650 such as, for example, a panel meter, for processing the signals 201 and data and information encoded therein, e.g., pressure, temperature, humidity, gas, pH, infrared, ultraviolet, visible light, voltage, current, power, conductivity, strain, or acceleration measurements and/or for transmitting command/control signals from the test and measurement device 650 to the wireless connector 100. In one embodiment, the test and measurement device 650 includes a display for exhibiting the received signals and/or a process control device for evaluating the process variable and for controlling a predetermined response thereto. It should be appreciated that, in effect, the universal wireless transceiver 600 converts the test and measurement device 650 into a device capable of sending and receiving signals over a wireless communication path. For example, input/output connections, shown generally at 652, of the test and measurement device 650 that were previously not wireless (e.g., non-wireless such as a hardwired cable or like connection) to sensors and other process measuring devices, are now coupled to the universal wireless transceiver 600 by input/output circuitry of the wireless transceiver 600, for example, the non-wireless connection 620, and the universal wireless transceiver 600 transmits/receives signals to/from wireless process measuring devices (e.g., the wireless connector 100) over the wireless communication path 601. Accordingly, the test and measurement device 650 is now capable of sending/receiving data, information and/or command/control information to wireless measuring devices that monitor such process variables as, for example, temperature, voltage, humidity, pressure, strain, resistance, motion, light, current, velocity, flow and the like.

Figure 8:
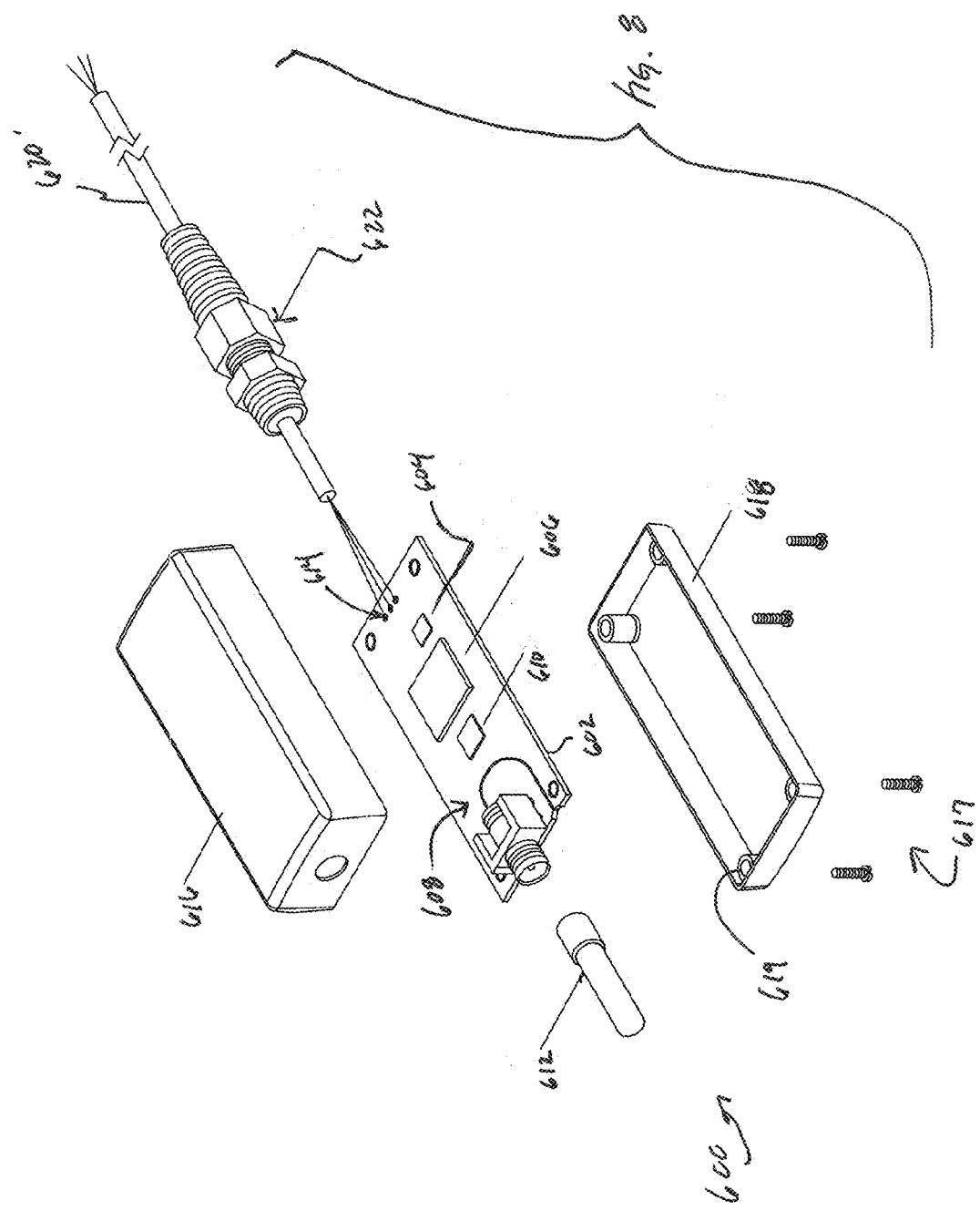
FIG. 8 is a schematic diagram of a wireless transceiver in accordance with one embodiment of the present invention.

In one embodiment, illustrated in FIG. 8, the universal wireless transceiver 600 includes a base 602 for electronic circuitry such as, for example, a printed circuit board or the like, a first cover portion 616, and a second cover portion 618. The first cover portion 616 may be secured in position about the base 602 by fasteners 617 such as, for example, screws, which pass through holes 619 in the second cover portion 618 and engage threaded bosses or the like (not shown) of the first cover portion 616. As shown in FIG. 8, the circuitry of the universal wireless transceiver 600 includes power regulator circuitry 604, a microprocessor 606 and communication circuitry 608 such as transceiver circuitry 610. The microprocessor 606 may be implemented using hardware components, one or more processors running one or more programs, or a combination of both and may be re-programmable to perform any suitable processing operations. As noted above, the communication circuitry 608 includes the transceiver circuitry 610 (e.g., a transceiver 610) for two-way wireless communication, e.g., both for transmitting data, information and command/control signals and for receiving data and information signals over the wireless communication path 601. In exemplary embodiments, the communication circuitry 608 also includes digital and/or analog input and/or output circuitry and an emitting device 612 such as, for example, an antenna, an optical emitter, or any other suitable emitting device.

As shown in FIG. 8, the non-wireless connection 620 between the universal wireless transceiver 600 and the test and measurement device 650 is comprised of a cable 620' coupled to leads 614 of the base 602. As is generally known in the art, the cable connection 620' includes means 622 for securing the non-wireless connection 620 to the first and second cover portions 616 and 618 such as, for example, a threaded cable connector or coupling.

The universal wireless transceiver 600 includes the power regulator circuitry 604 disposed on the base 602 for delivering electrical power to components of the universal wireless transceiver 600. In one embodiment, the power regulator circuitry 604 includes an internal power supply such as, for example, a battery. In another embodiment, power regulator circuitry 604 requires no internal power supply (e.g., battery) and instead receives electrical power from a host instrument (e.g., the test and measurement device 650) or is coupled to an external power source. Accordingly, the universal wireless transceiver 600 is a self contained wireless device that may be mounted to an existing non-wireless test and measurement device or instrument. By coupling the universal wireless transceiver 600 to the existing device or instrument allows the instrument to receive wireless data and information (e.g., measurements of process variables) from a wide selection of sensors such as, for example, temperature, voltage, humidity, pressure, strain, resistance, motion, light, current, air velocity and flow measuring devices. For example, the universal wireless transceiver 600 receives data and information over the wireless communication path 601, processes the measurement data and information (e.g., with microprocessor 606), for example, converts the measurement data and/or information to an analog or digital output signal that is then feed or provided to the input/output connections 652 of the test and measurement device 650.

It should be appreciated that similar to the data communication circuitry 415 and 515 described above, the communication circuitry 608 of the universal wireless transceiver 600 manages communication from a plurality of sensors and/or wireless connectors (e.g., the wireless connectors 100 and 300) by individually recognizing the sensors and/or connectors and assigning them different communication channels in the wireless communication path 601, for example, different frequencies, time slots, chipping codes, or other differentiating communication characteristics. For example, in one embodiment, the communication circuitry 608 may include a ZigBee coordinator or a ZigBee router. In one embodiment, the communication circuitry 608 employs automatic communication channel switching (e.g., RF channel switching) to minimize or eliminate interference from other wireless communication devices.

Figure 9:
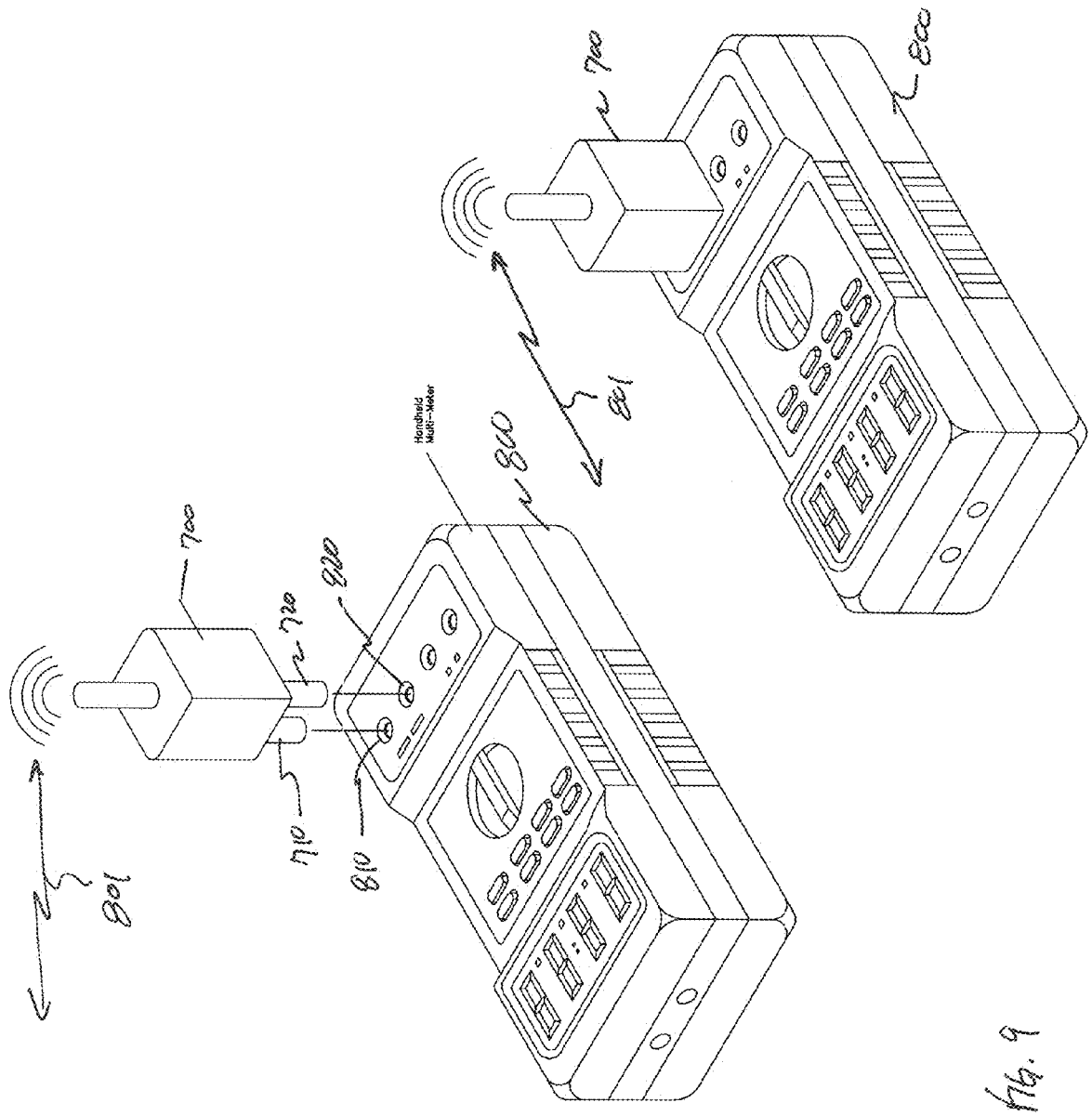
FIG. 9 is a schematic diagram of a wireless transceiver in accordance with another embodiment of the present invention.

In one embodiment, illustrated in FIG. 9, a wireless transceiver 700 includes the circuitry of the universal wireless transceiver 600, for example, the power regulator circuitry 604, the microprocessor 606 and the communication circuitry 608 such as the transceiver circuitry 610. In the illustrated embodiment, the wireless transceiver 700 includes an internal power supply, for example, a battery for supplying power to components of the wireless transceiver 700. The wireless transceiver 700 differs from the wireless transceiver 600 (FIG. 8) in that the non-wireless connection 620 is comprised of male connector pins 710 and 720 and does not include the hardwired cable connection 620'. The male connector pins 710 and 720, respectively, are received by corresponding input/output connectors 810 and 820 of a test and measurement device 800 such as, for example, a portable, handheld test and measurement device. In one embodiment, the handheld test and measurement device 800 is a handheld multimeter, thermometer, or the like. In one embodiment, the input/output connectors 810 and 820 are cylindrical or blade shaped extending contacts. As noted above, the wireless transceiver 700 provides two-way wireless communication between the handheld device 800 and sensors 200 over a wireless communication path 801, e.g., both for transmitting data and information signals from the sensors 200 to the handheld device 800 and for receiving data, information and/or command/control signals from the test and measurement device 800 (e.g., the handheld device 800) to the sensors 200 over a wireless communication path 801.

Thus, the disclosed embodiments provide a mechanism to utilize multiple sensors for monitoring and control a process without the drawbacks of installing and maintaining multiple hardwired connections. Moreover, the disclosed embodiments teach systems and methods for converting existing systems using test and measurement equipment hardwired to sensors, into systems that use test and measurement equipment that is coupled to sensors by wireless communication connections. Accordingly, the disclosed embodiments generally eliminate the need for wired connections from and between sensors and test and measurement devices and controllers.

It should be understood that the foregoing description is only illustrative of the present embodiments. Various alternatives and modifications can be devised by those skilled in the art without departing from the embodiments disclosed herein. Accordingly, the embodiments are intended to embrace all such alternatives, modifications and variances which fall within the scope of the appended claims.

What is claimed is:
1. A wireless transceiver, comprising:
a microprocessor for processing signals;
communication circuitry coupled to the microprocessor, the communication circuitry including input/output circuitry for receiving the signals from a plurality of wireless devices over a wireless communication path, providing the signals to the microprocessor and for transmitting processed signals from the microprocessor to the plurality of wireless devices;

wherein the input/output circuitry includes a non-wireless connection coupling the wireless transceiver to a test and measurement device, and wherein the test and measurement device receives the processed signals from the microprocessor.

2. The wireless transceiver of claim 1, wherein the input/output circuitry includes a transceiver.

3. The wireless transceiver of claim 1, wherein the plurality of wireless devices include at least one device having a sensor for sensing a process variable and a transmitter for transmitting the process variable as data and/or information within signals to the wireless transceiver over the wireless communication path.

4. The wireless transceiver of claim 3, wherein the process variable includes at least one of temperature, voltage, humidity, pressure, strain, resistance, motion, light, current, velocity and flow.

5. The wireless transceiver of claim 3, wherein the test and measurement device processes the received signal and data and/or information encoded therein and performs a predetermined response thereto.

6. The wireless transceiver of claim 1, wherein the input/output circuitry include digital and/or analog input/output circuitry.

7. The wireless transceiver of claim 1, wherein the processed signals transmitted from the microprocessor to the plurality of wireless devices include data, information, and command and control signals.

8. The wireless transceiver of claim 1, wherein the processor controls communication from the plurality of wireless devices by individually recognizing each of the plurality of wireless devices and assigning different communication channels within the wireless communication path.

9. The wireless transceiver of claim 8, wherein the different communication channels include different frequencies, time slots, chipping codes, and other differentiating communication characteristics.

10. The wireless transceiver of claim 1, further comprising power regulator circuitry for providing power to the wireless transceiver.

11. The wireless transceiver of claim 10, wherein the power regulator circuitry receives the power for the wireless transceiver from the test and measurement device.

12. The wireless transceiver of claim 1, wherein the non-wireless connection coupling the wireless transceiver to the test and measurement device is comprised of a hardwired cable connection.

13. The wireless transceiver of claim 1, wherein the wired connection coupling the wireless transceiver to the test and measurement device is comprised of male connector pins.

14. A system for controlling a process, comprising:

a plurality of sensors for sensing at least one process variable at predetermined points of the process;

a plurality of wireless transmitters coupled to corresponding ones of the plurality of sensors, each of the plurality of wireless transmitters receiving signals including the sensed process variable from the corresponding one of the sensors and transmitting the signals over a wireless communication path;

a wireless communication transceiver receiving the transmitted signals from the wireless communication path, the wireless communication transceiver including:

a microprocessor for processing the received signals; and communication circuitry coupled to the microprocessor, the communication circuitry having input/output circuitry for receiving the signals, providing the signals to the microprocessor and for transmitting processed signals from the microprocessor to the plurality of wireless devices; and at least one test and measurement device coupled to the wireless communication transceiver by a non-wireless connection, the test and measurement device receiving the processed signals from the microprocessor over the non-wireless connection, evaluating the process variable and controlling a predetermined response thereto.

15. The system of claim 14, wherein the process variable includes at least one of temperature, voltage, humidity, pressure, strain, resistance, motion, light, current, velocity and flow.

16. The system of claim 14, wherein the test and measurement device is comprised of a device that is initially coupled to one of the sensors via a hard wired communication path.

17. The system of claim 14, wherein the non-wireless connection coupling the wireless transceiver to the at least one test and measurement device is comprised of a hardwired cable connection.

18. The system of claim 14, wherein the non-wireless connection coupling the wireless transceiver to the at least one test and measurement device is comprised of male connector pins.

* * * * *